(12) United States Patent
Munz

(10) Patent No.: US 10,943,017 B2
(45) Date of Patent: Mar. 9, 2021

(54) METHOD FOR STORAGE OF ELECTRONICALLY SIGNED DOCUMENTS

(71) Applicant: Wolfgang Munz, Gaildorf (DE)

(72) Inventor: Wolfgang Munz, Gaildorf (DE)

(*) Notice: Subject to any disclaimer, the term of this patent is extended or adjusted under 35 U.S.C. 154(b) by 299 days.

(21) Appl. No.: 16/186,829

(22) Filed: Nov. 12, 2018

(65) Prior Publication Data

US 2019/0147171 A1 May 16, 2019

(30) Foreign Application Priority Data

Nov. 10, 2017 (DE) ...................... 10 2017 126 483.3

(51) Int. Cl.
*G06F 21/60* (2013.01)
*G06F 21/64* (2013.01)
(Continued)

(52) U.S. Cl.
CPC ............ *G06F 21/602* (2013.01); *G06F 21/32* (2013.01); *G06F 21/6209* (2013.01); *G06F 21/64* (2013.01); *G06F 21/645* (2013.01)

(58) Field of Classification Search
CPC .... G06F 21/602; G06F 21/32; G06F 21/6209; G06F 21/64; G06F 21/645
See application file for complete search history.

(56) References Cited

U.S. PATENT DOCUMENTS 5,825,880 A * 10/1998 Sudia ...................... G06F 21/40
                                                                       713/180
6,175,626 B1    1/2001 Aucsmith et al.
(Continued)

FOREIGN PATENT DOCUMENTS

AT        509 043 A1    5/2011
WO   01/13574 A1    2/2001

OTHER PUBLICATIONS

Elektronische Signatur. In: Wikipedia, Die freie Enzyklopädie. Bearbeitungsstand: Oct. 26, 2017. URL: https://de.wikipedia.org/w/index.php?title=Elektronische_Signatur&oldid=170330521 [abgerufen am Oct. 2, 2018].

(Continued)

*Primary Examiner* — Ayoub Alata
(74) *Attorney, Agent, or Firm* — Collard & Roe, P.C.

(57) ABSTRACT

In daily business life, the personal signature on paper is being increasingly superseded by electronic signatures. In this situation, however, the problem of authentication of the signature exists. Since a signature card, for example, can also be used by a third party, it cannot be reliably determined with it that a signature in question also really originated from the alleged signer. Likewise, it cannot be assured that manipulations of the documents or signatures will not be performed at a later time.

Figure 1:
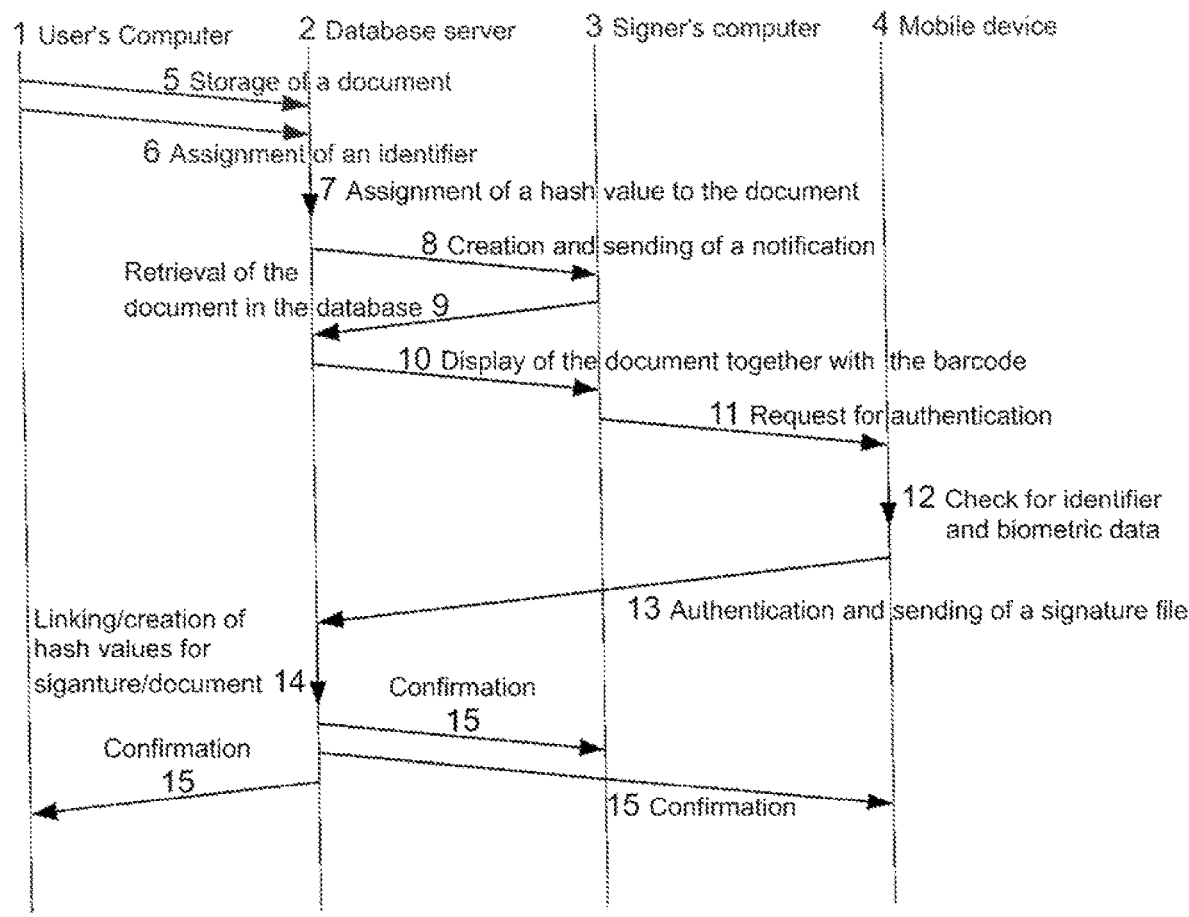

The present invention therefore proposes saving documents in a database and also verifying, via signatures files, signatures affixed in connection with the document. The signature files for this purpose are generated on the basis of a certificate of the signer and likewise stored in the online archive, wherein a fingerprint is created both for the signature file as such and also for its link to the document. In the case of a manipulation of even only one of the three components, the signature becomes invalid.

12 Claims, 2 Drawing Sheets

(51) Int. Cl.
*G06F 21/32* (2013.01)
*G06F 21/62* (2013.01)

(56) References Cited

U.S. PATENT DOCUMENTS

| | | | | |
|---|---|---|---|---|
| 6,237,096 | B1* | 5/2001 | Bisbee | H04L 9/3213 |
| | | | | 713/178 |
| 6,363,479 | B1* | 3/2002 | Godfrey | G06F 21/645 |
| | | | | 380/28 |
| 6,959,382 | B1* | 10/2005 | Kinnis | G06F 21/602 |
| | | | | 713/168 |
| 2003/0078880 | A1* | 4/2003 | Alley | G06Q 40/025 |
| | | | | 705/38 |
| 2006/0075245 | A1 | 4/2006 | Meier | |
| 2016/0335479 | A1 | 11/2016 | Bartlett, II et al. | |
| 2017/0201376 | A1* | 7/2017 | Morgner | G06Q 20/3827 |

OTHER PUBLICATIONS

Qualifizierte elektronische Signatur. In: Wikipedia, Die freie Enzyklopädie. Bearbeitungsstand: Sep. 22, 2017. URL: https://de.wikipedia.org/w/index.php?title=Qualifizierte_elektronische_Signatur&oldid=169320586 [abgerufen am Oct. 2, 2018].

Mobile Signature. In: Wikipedia, The Free Encyclopedia. Bearbeitungsstand: Jul. 24, 2017. URL: https://en.wikipedia.org/w/index.php?title=Mobile_signature&oldid=792106562 [abgerufen am Oct. 2, 2018].

Install digital certificates on Windows 10 Mobile. In: Microsoft Docs, Jul. 27, 2017. URL: https://docs.microsoft.com/en-us/windows/security/identityprotection/installing-digital-certificates-on-windows-10-mobile [abgerufen am Oct. 2, 2018].

How do I sign and encrypt emails on a Samsung Galaxy device?. In: Quovadisglobal.com, Apr. 26, 2013. URL: https://support.quovadisglobal.com/kb/a404/how-do-i-sign-and-encrypt-emails-on-a-samsung-galaxy-device.aspx [abgerufen am Oct. 2, 2018].

* cited by examiner

METHOD FOR STORAGE OF ELECTRONICALLY SIGNED DOCUMENTS

CROSS REFERENCE TO RELATED APPLICATIONS

Applicant claims priority under 35 U.S.C. § 119 of German Application No. 10 2017 126 483.3 filed on Nov. 10, 2017, the disclosure of which is incorporated by reference.

The present invention relates to a method for storage of electronically signed documents.

Such methods are already known in diverse forms in the prior art. Contracts, declarations and other documents of the most diverse type have already been authenticated by their signature for several centuries. The signature turns a simple written instrument into a binding document, and so from time immemorial it has already been questioned whether a signature is genuine. In the middle ages, for example, legal records were certified by stamped seals, which were practically secure against falsification for those times.

Later on, the handwritten signature became accepted in Europe as a binding signature, possibly also before witnesses, whereas in Asia, name stamps are in frequent use to this day. Particularly important contracts are still signed before the notary even today, so that he/she can be invoked as witness.

However, these approaches can be adopted only more than incompletely for electronic legal transactions, where especially the communication and signing of contracts or other documents no longer necessarily take place in the presence of the other party to the contract or recipient of the declaration.

A simple, quite rudimentary possibility of transferring the handwritten signature to the electronic legal transaction consists in the use of an image reproduction of a signature. By means of appropriate software, this may either be placed as a whole on a signature field or transferred via an electronic input means directly into an entry field. By the fact that the opposite party is usually not personally present at the signing, however, the danger exists that the signature of a person not authorized for the purpose will be used, and in this way a legal transaction will be entered into in the name of the signer, who possibly did not intend to enter into it or was not even aware of it.

One step further is achieved by a known system, in which a document is saved in the so-called cloud, i.e. a database system accessible via the Internet. In order to obtain a signature for this document, a cover letter is sent to an e-mail address of the desired signer, who is then able to sign the document by one click on an Internet reference. In this system, however, the authentication is based exclusively on the assumption that the e-mail actually reaches the desired recipient. If a third party obtains access to this cover letter, perhaps on the basis of intercepted e-mails, forwarded e-mails or commonly used access data, that third party may then, without further authentication, enter into the legal transaction in the name of the addressee.

Once a document has been signed and is present in this state in an online archive, it is once again impossible to be certain that no further influence will be exerted on the document after the signing. Once signed in the above-mentioned way, a document could be manipulated and resaved with changes, without this necessarily having been apparent to a later observer.

Against this background, the task underlying the present invention is to specify a method for storage of electronically signed documents that overcomes the disadvantages of the prior art and ensures both a secure way of retention of signed documents and a method associated therewith for signing of electronic documents.

This task is accomplished by a method according to the features of claim 1. Further meaningful configurations of such a method may be inferred from the dependent claims.

According to the invention, a database in the broadest sense is realized, in which a document scheduled to receive a binding signature is saved. Any kind of binary content, and therefore not only text documents but also videos, images or even data streams, are to be understood as a document. For this purpose, a database may be a dedicated database system or else a simple memory organized, for example, via a directory structure. As soon as the signature has been affixed, which may be done by any number of signers per document, a signature file is generated by means of a certificate assigned uniquely to the at least one signer and stored in the database in association with the document. i.e. linked therewith. In the case of a single signer, a completely signed document exists, consequently comprising the document itself as well as a signature file, which is a link between a certificate and the document itself.

An optional aspect of the invention is that the database server to which the database is assigned creates respectively one electronic fingerprint for the signature file and the document itself, and preferably, in addition, a further electronic fingerprint covering the entirety of all components. If the signature assigned to the document is called into question, both files and if necessary also their interconnection is checked and verified for their integrity on the basis of the fingerprints.

Only when the integrity of all components is assured may it be stated with certainty that the document and the associated signature are still the real thing.

In this connection, a creation of such a fingerprint and conversely the check of integrity of such by the database server may be undertaken, for example, by performing a checksum calculation. The use of a so-called scattered-value function or else hash function is also a widely known option for such a generation of an electronic fingerprint. This process constitutes a mapping of complex input values onto compact hash values, which preferably are scalar variables. Due to the ease of calculation of a scalar hash value for complex input values, a compact electronic 'fingerprint' of a document is derived that can be quickly checked. If one document differs from the other, its hash value also differs in the case of a perfect, i.e. unique, hash function.

In order to determine subsequently in the integrity check whether the checksums or hash values for the files match, i.e. signature file and document, these are recalculated on the basis of the existing documents and compared with the saved electronic signature file. If the saved signature file differs from the newly calculated values, the integrity of the document must be called into question. This may be done, for example, via an Internet browser, via which the database server is accessed. However, it may also be done either directly via a mobile-device app, or possibly with use of a QR code, which is read in via the mobile device and retrieved via it.

Other possible forms of electronic signatures for documents may also be used without problems and may be fitted seamlessly into the context of the invention, however this should not be construed as a restriction of the invention to checksums or hash functions.

If a document is now saved in the database, the database server will already create an electronic fingerprint first of all and thus protect it from changes. The person who saves the document, or another person authorized to do so, may then add to the document the identifier of a signer from whom a signature is needed. This does not necessarily involve the signing of a contract and the like, but instead may even be a simple release of an order, confirmation of the genuineness of information and many more situations by the storage and subsequent signing of a corresponding document being processed via the solution according to the invention.

An identifier of the signer must have already been saved in the database server beforehand, wherein different strengths may be processed with authentication levels. The system provides for permitting simple or more complex authentications, which must be done one time prior to the use of the system. After the one-time authentication, the method according to the invention runs identically for all authentication levels. For example, if a signer is personally known, he/she receives a high authentication level. If authentication takes place only by e-mail, the authentication level is extremely low.

As soon as the identifier of the desired signer has been stored, the database server will link the identification with the document to be signed and in this way define the associated signer of the document. In this way it is made impossible for a different signer to sign the document. If the signature file of the signer and the identifier assigned to the document do not match during the authentication of the signer, the database server will not accept the signature. In contrast, if the database server accepts the signature file of the signer, because it matches the identifier, the database server will save the signature file kept in readiness by the signer in the database and link it with the document. Electronic fingerprints will likewise be created for signature file and link.

With some advantage, the signature file is imported by a mobile device of the signer, on which device the signer on the one hand keeps the certificate available and on the other is able to provide authentication. For this purpose, the mobile device must have available not only the certificate but inherently also an identification of the document and means for authentication of the signer.

Specifically, an identification of the document may already be achieved by the fact that the document is displayed on a screen of the mobile device. The mobile device then links the displayed document with the release of the signer and, after his/her authentication, will generate the signature file on the basis of the certificate stored on the mobile device and will upload it to the database server. In contrast, if the signer receives the document by mail or if, for greater reading comfort, for example, he/she opens the document not on his/her mobile device but on a different device, then a machine-readable, graphic code, such as a QR code, barcode or many of the like, assigned to a document, may be read in by an optical reading device of the mobile device. Hereby the mobile device is able to establish a relationship between the document to be signed and its certificate when it presents the signature file to the database server for upload.

However, to ensure that the signer receives knowledge at all that a document is present for signing, the database server will send, to the signer, at an address associated with his/her identifier, a notification whether by an e-mail, a push message to a mobile device application, an SMS or similar messages that can be received personally by the signer, and thereby notify the signer of the document to be signed. Advantageously, a link to the document in the database will be assigned directly to the notification, so that the document can be opened using the mobile device application or else via an Internet browser. From that point on, the described process of the signing runs. In the case of a use of a mobile device application, the step of the QR scan may even be omitted, since the mobile device application can access the saved data directly.

In each case, a certificate may be created under different viewpoints. In addition, the issuance of certificates may be reserved for particular institutions. In particular, these may be external certification authorities specially provided for the purpose, which create certificates in connection with their services and enjoy a corresponding reputation. Furthermore, however, certificates may also be created system-internally by the database server or the mobile device application.

Among other possibilities, certificates may also be generated in dependence on situation data. Thus a mobile device application may issue a certificate when, for example, it is to be created at a certain location with incorporation of a signature. If signature and location are plausible as identification of a person, a certificate may be issued. The most diverse situation data may be considered for this purpose, including images, texts, number codes, GPS data, identifiers, MAC addresses, IP addresses, SIM card numbers or IMEI numbers, wherein this list is to be considered as an example but not exhaustive.

Figure 2:
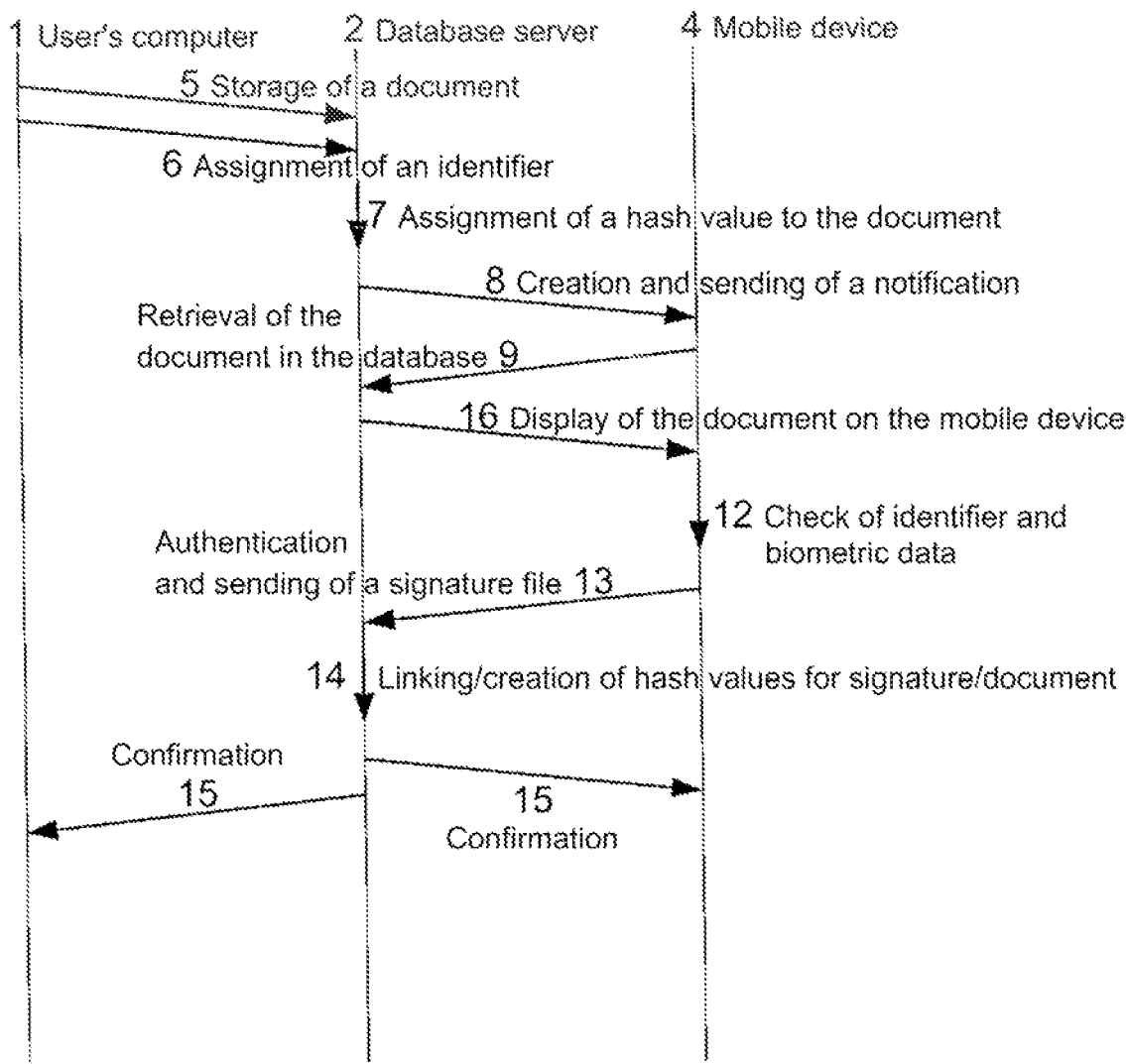

The invention described in the foregoing will be explained in more detail in the following on the basis of an exemplary embodiment, wherein FIG. 1 shows a handshake diagram of the communication sequence for the signing according to the invention, in which the document to be signed is displayed on a computer, and FIG. 2 shows a simplified variant of the sequence shown in FIG. 1, in which the document is displayed directly on the releasing mobile device.

FIG. 1 shows a handshake diagram between four communication participants, wherein an authentication of a document being held by a user is to be achieved by a signer. This text may be of any origin. However, the user wishes to be certain that the text is authentic and for this purpose to receive a secure confirmation of the signer.

For this purpose, in a step 5, the user uploads the document to be confirmed from a user's computer 1 to the database server 2. Moreover, in a step 6, an identifier of the signer is assigned by the user to the document, so that the person who is supposed to sign the document is saved in the database server 2. The identifier in this case is an e-mail address of the signer, on the basis of which the database server 2 is now able to address the signer.

For this purpose, the database server 2 will first generate, in a step 7, an electronic fingerprint for the document in the form of a hash value, which uniquely characterizes the document. Furthermore, it will read out the identifier associated with the document. In step 8, the database server 2 will now create a notification on the basis of the data received from the user's computer, which notification it sends as an e-mail to the e-mail address of the signer used as identifier. The notification contains a link, via which the receiving signer obtains an access to the document on his/her signer's computer 3. However, since the access is to be granted only to the signer and not to an arbitrary third party, in step 9 the database server 2 will grant access to the document only when the signer is able to authenticate himself/herself to the database server 2, for example by logging onto the database server 2 with login data that match the identifier saved for the document.

Then, in a step 10, the document will be displayed to the signer on his/her signer's computer 3 together with a barcode. The signer now checks the document. If the signer decides to sign the document, he/she will now take his/her mobile device 4 by hand and scan in the barcode. This is done with a dedicated authentication application. In a step 11, a request for authentication is started with the scanning-in of the barcode, and the signer is prompted, after a check of the text of the document, to undertake authentication on the mobile device 4 by reading in biometric data such as, in particular, his/her biometric fingerprint, or by measuring his/her face. In the mobile device 4, a check of the agreement of identifier and biometric data now takes place in step 12. If it can be established in the mobile device 4 that the signer is actually issuing the release himself/herself, a signature file generated by means of a certificate of the signer saved in the memory of the mobile device 4 is transmitted in step 13 to the database server 2, which displays a link between the document and the certificate.

In a step 14, the database server 2 receives the signature file from the mobile device 4, stores it together with the document and generates not only a hash value for the document but now also unique hash values for the signature file. The document is now signed and remains so in the database of the database server 2. At the conclusion of the process, the database server 2 sends a confirmation of the successful signing to the user's computer 1, the signer's computer 3 and the mobile device 4.

If, as illustrated in FIG. 2, the document is displayed directly on the mobile device, the sequence may be somewhat different. Here also, in step 5, the user uploads the document to be confirmed from the user's computer 1 to the database server 2 and in step 6 adds the identifier of the signer to it. In step 7, the database server 2 adds a hash value for the document.

In step 8, however, the database server now sends a notification as a push message directly to the authentication application on the mobile device 4. If the signer opens this application on his/her mobile device 4, in step 9 the mobile device will retrieve the document from the database server 2 and in step 16 will display it to the signer. Since this runs directly in the authentication application, the display of an additional barcode is omitted here, as is subsequently the working step of scanning in the barcode.

Otherwise, the authentication now runs just as before. The signer is again prompted to check the text and may then read in his/her biometric data and thus undertake the signing. The mobile device 4 relays the authentication to the database server 2 and in step 13 sends the signature file to the database server 2, where the signature file is saved together with the document and associated hash values. Final confirmation of successful signing now goes only to the mobile device 4 and the user's computer 1.

What has been described in the foregoing is therefore a method for storage of electronically signed documents, wherein the signature file, as the link between the document and a certificate of a signer, is provided by a database server assigned to a database with respectively one electronic fingerprint and preferably also with a common electronic fingerprint. Thus a secure authentication can be achieved.

LIST OF REFERENCE SYMBOLS

1 User's computer
2 Database server
3 Signer's computer
4 Mobile device
5 Storage of a document
6 Assignment of an identifier
7 Assignment of a hash value to the document
8 Creation and sending of a notification
9 Retrieval of the document in the database
10 Display of the document together with a barcode
11 Request for authentication
12 Check of identifier and biometric data
13 Authentication and sending of a signature file
14 Linking/creation of hash values for signature/document
15 Confirmation
16 Display of the document on the mobile device

The invention claimed is:

1. A method for storage of electronically signed documents, in which at least one signature file of a signer of a signed document is assigned to an electronically signed document as a link between the document itself and a certificate uniquely assigned to the signer, wherein a database server generates a first hash value for the document and a second hash value for the at least one signature file and undertakes an integrity check upon request based on the first and second hash values and only in a case of an establishment of the integrity of the document and of the at least one signature file does it confirm a validity of the signature.

2. The method according to claim 1, wherein, in the course of a signing process, the at least one signature file is created by means of the certificate of the signer, imported into a database of the database server and linked to the document, and an electronic fingerprint is created for the signature file, wherein the electronic fingerprint is created for the signature file only if the database server obtains an authentication of the signer assigned to the signature file and establishes a correspondence between the signature file and a unique identifier of the signer assigned to the document.

3. The method according to claim 2, wherein an electronic fingerprint for a document is created immediately after the storage in the database and at least one unique identifier of a signer saved in the database is assigned to the document.

4. The method according to claim 2, wherein a signature file is generated by means of the certificate stored on a mobile device of a signer and imported into the database, after an identification of the document and an authentication of the signer have been achieved on the mobile device.

5. The method according to claim 4, wherein the database server, for identification of the document, sends the signer a notification that contains the unique identifier of the signer and that refers to the document stored in the database, wherein, for identification by the signer, the document is displayed directly on a screen of the mobile device or the identification of the document is achieved by a reading-in of a graphic code associated with the document displayed in another way by an optical reading device of the mobile device.

6. The method according to claim 4, wherein the authentication of the signer by a code entry or a biometric scan by means of biometric sensing devices of the mobile device takes place, provided an identifier associated with the document matches the signature file of the signer.

7. The method according to claim 3, wherein the unique identifier of the signer is saved in the database server prior to a signing.

8. The method according to claim 2, wherein the database server sends the signer a notification in a form of an e-mail or a push message via a linking of his/her unique identifier with a document at an address linked to the unique identifier.

9. The method according to claim 2, wherein the electronic fingerprint is a checksum calculation.

10. The method according to claim 9, wherein the integrity check comprises repeated calculation of the checksums.

11. The method according to claim 1, wherein the certificate is created by the database server, a mobile device application or an external certificate authority.

12. The method according to claim 11, wherein the creation of the certificate takes place by incorporation of situation data.

* * * * *